United States Patent
Nose et al.

(10) Patent No.: US 11,807,212 B2
(45) Date of Patent: Nov. 7, 2023

(54) CONTROL DEVICE FOR HYBRID VEHICLE

(71) Applicant: TOYOTA JIDOSHA KABUSHIKI KAISHA, Toyota (JP)

(72) Inventors: Yuki Nose, Nagoya (JP); Yuto Ikeda, Okazaki (JP); Takanobu Gotoh, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/583,718

(22) Filed: Jan. 25, 2022

(65) Prior Publication Data

US 2022/0242389 A1     Aug. 4, 2022

(30) Foreign Application Priority Data

Feb. 1, 2021     (JP) ................ 2021-014241

(51) Int. Cl.
*B60W 20/10*     (2016.01)
*B60W 10/06*     (2006.01)
(Continued)

(52) U.S. Cl.
CPC ............ *B60W 20/10* (2013.01); *B60W 10/06* (2013.01); *B60W 10/08* (2013.01); *F02D 17/02* (2013.01);
(Continued)

(58) Field of Classification Search
CPC ...... B60W 20/10; B60W 10/06; B60W 10/08; B60W 2510/0657; B60W 2710/0616;
(Continued)

(56) References Cited

U.S. PATENT DOCUMENTS

2005/0003926 A1*  1/2005  Hanada ................. B60W 10/08
                                                                          477/3
2021/0107452 A1   4/2021  Nose et al.

FOREIGN PATENT DOCUMENTS

JP     2009-248698 A    10/2009
JP        5962840 B2 *   8/2016  ............ F02D 17/00
JP     2021-060027 A     4/2021

OTHER PUBLICATIONS

Machine Translation of JP-5962840-B2 PDF file name: "JP5962840B2_Machine_Translation.pdf".*

\* cited by examiner

*Primary Examiner* — Grant Moubry
*Assistant Examiner* — Ruben Picon-Feliciano
(74) *Attorney, Agent, or Firm* — Oblon, McClelland, Maier & Neustadt, L.L.P.

(57) ABSTRACT

An ENG-ECU performs a specific cylinder fuel cutoff process of stopping combustion of an air-fuel mixture in some cylinders out of a plurality of cylinders of an internal combustion engine and a transmission process of transmitting engine operation information on execution of the specific cylinder fuel cutoff process to an HV-ECU. The HV-ECU performs a torque compensation process of compensating for a decrease in engine torque due to execution of the specific cylinder fuel cutoff process using an output torque of a second MG based on the received engine operation information. The ENG-ECU performs a process of starting the specific cylinder fuel cutoff process in a combustion cycle when a waiting time which includes a time until the HV-ECU receives the engine operation information has elapsed after the transmission process has been performed.

3 Claims, 4 Drawing Sheets

(51) Int. Cl.
*B60W 10/08* (2006.01)
*F02D 17/02* (2006.01)
*F02D 41/30* (2006.01)

(52) U.S. Cl.
CPC ..... *F02D 41/30* (2013.01); *B60W 2510/0657* (2013.01); *B60W 2710/0616* (2013.01); *B60W 2710/083* (2013.01)

(58) Field of Classification Search
CPC ... B60W 2710/083; F02D 17/02; F02D 41/30
See application file for complete search history.

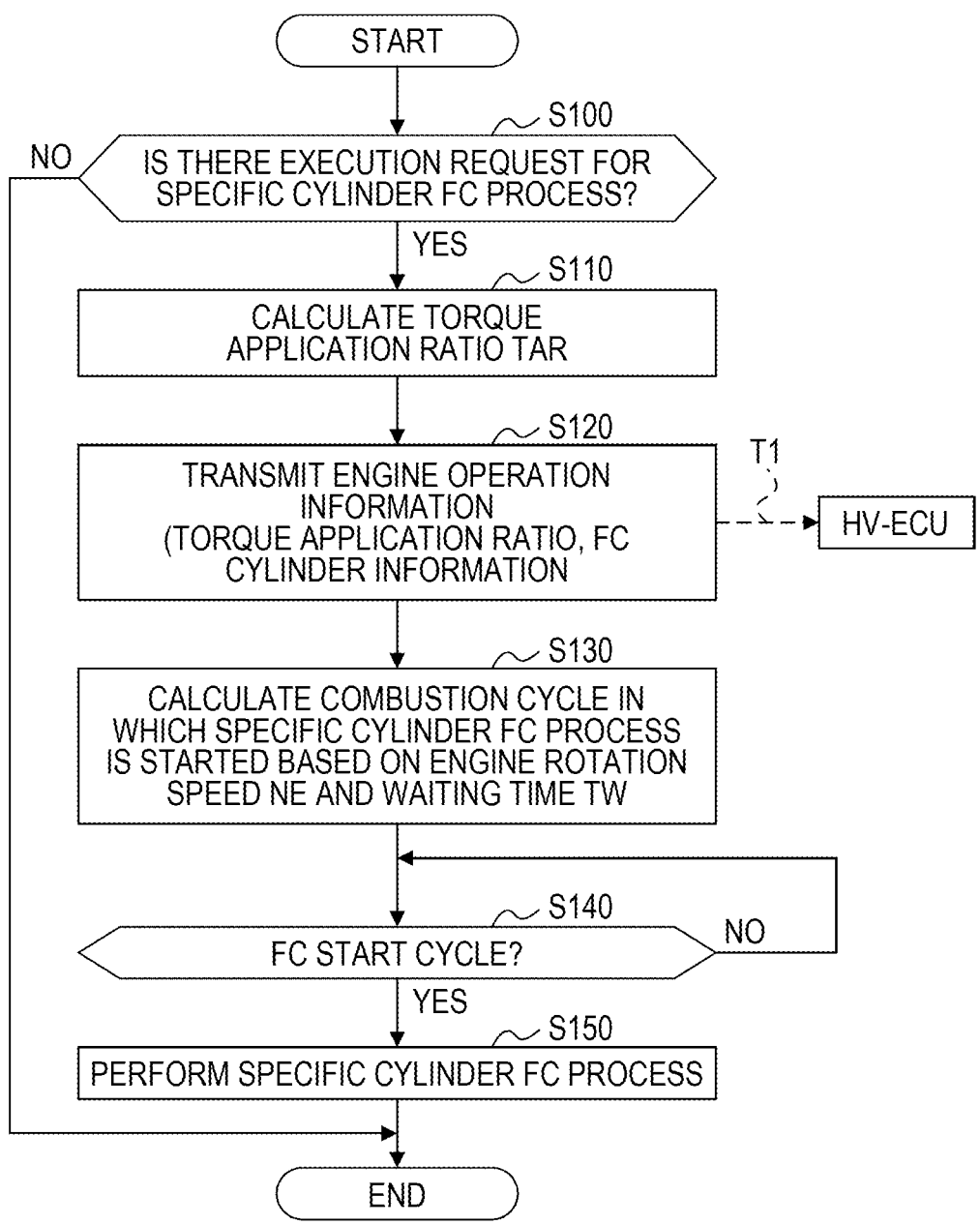

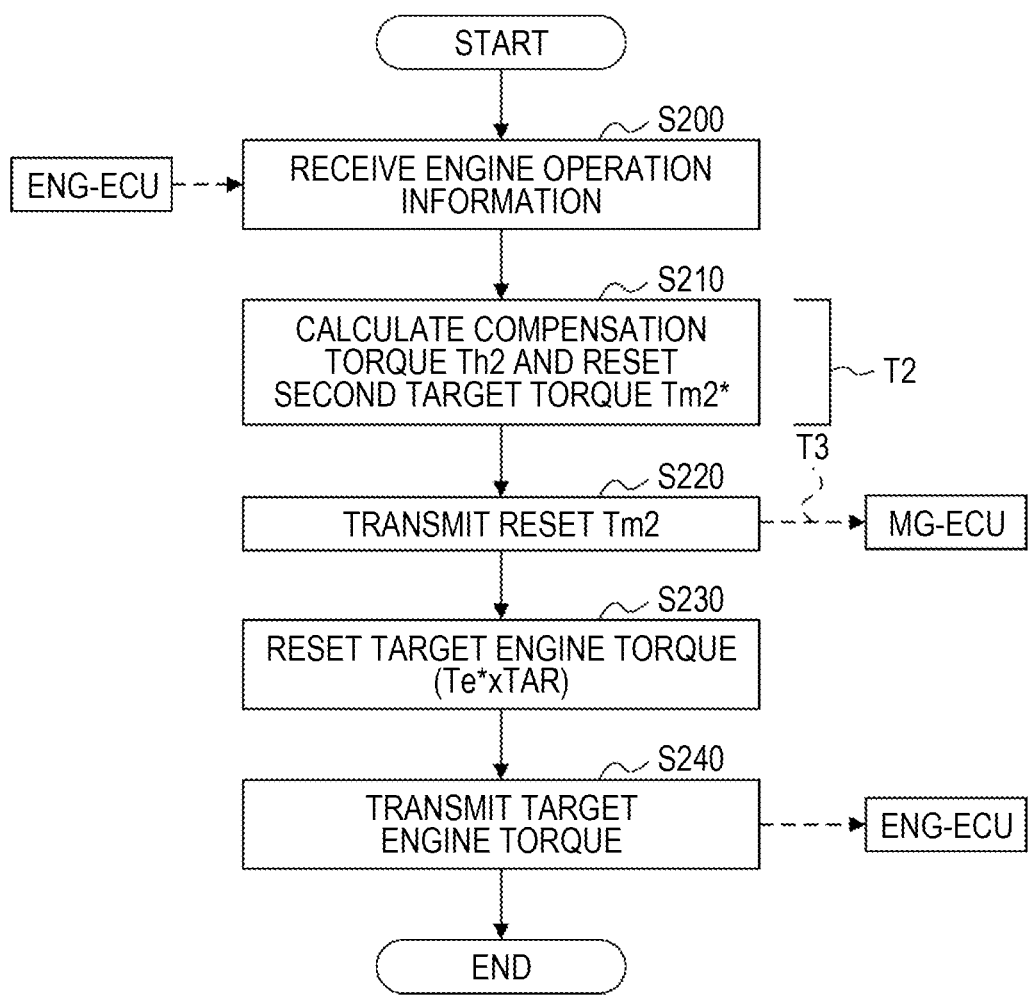

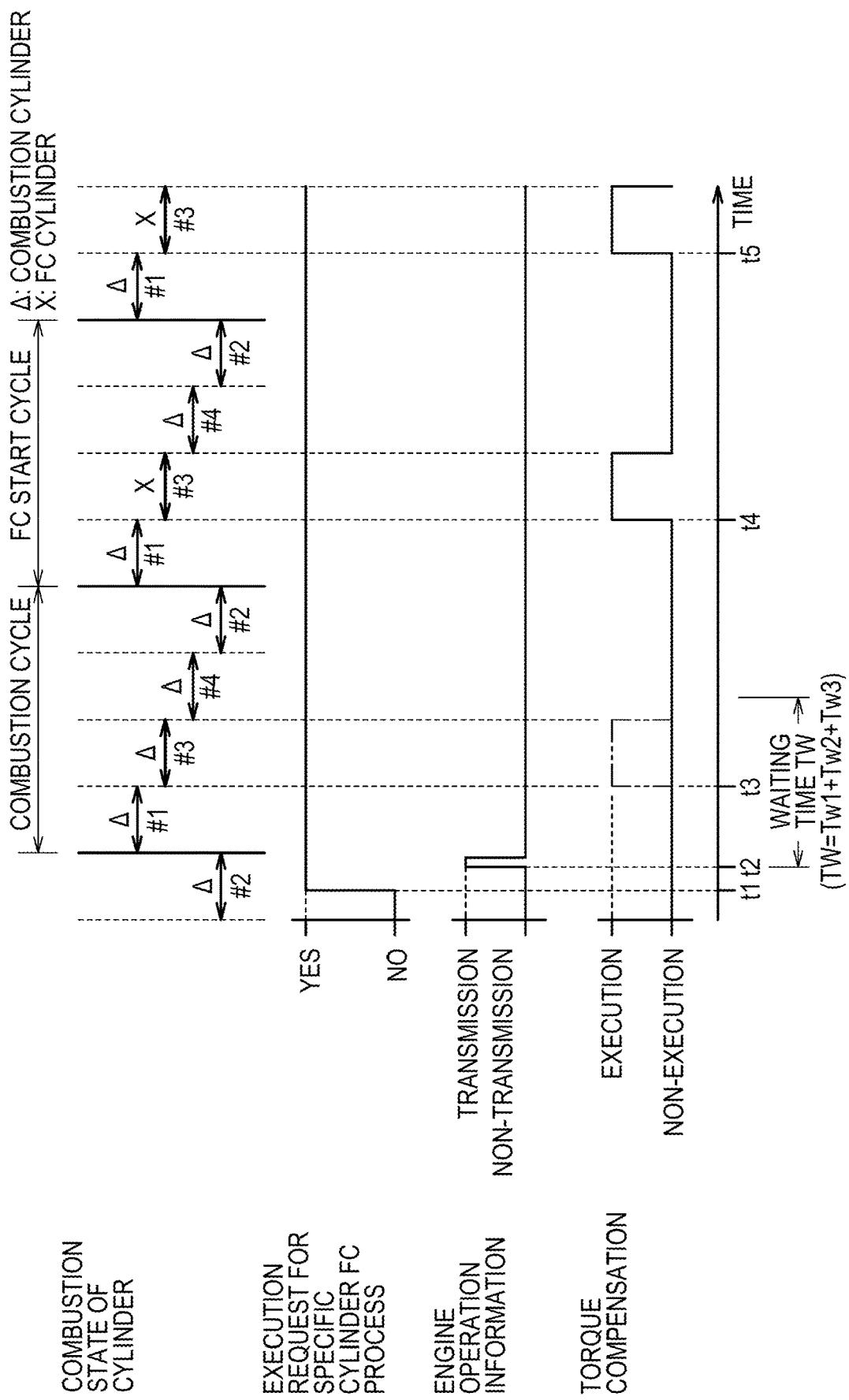

CONTROL DEVICE FOR HYBRID VEHICLE

CROSS-REFERENCE TO RELATED APPLICATION

This application claims priority to Japanese Patent Application No. 2021-014241 filed on Feb. 1, 2021, incorporated herein by reference in its entirety.

BACKGROUND

1. Technical Field

The present disclosure relates to a control device for a hybrid vehicle.

2. Description of Related Art

In a hybrid vehicle disclosed in Japanese Unexamined Patent Application Publication No. 2009-248698 (JP 2009-248698 A), an internal combustion engine including a plurality of cylinders and an electric motor are mounted as drive power sources. This hybrid vehicle includes a control device for an engine that controls the internal combustion engine, a control device for the electric motor that controls the electric motor, and a comprehensive control device that comprehensively controls the internal combustion engine and the electric motor. In this hybrid vehicle, torque compensation using the electric motor is performed to curb a torque shock due to fuel cutoff of the internal combustion engine.

SUMMARY

Fuel cutoff of the internal combustion engine and torque compensation using the electric motor are performed by different control devices. Accordingly, since a delay occurs in mutual communication through which information is transmitted between the control devices, there is concern that the torque compensation using the electric motor will not match an execution timing of the fuel cutoff.

According to an aspect of the present disclosure, there is provided a control device for a hybrid vehicle that is applied to a hybrid vehicle in which an internal combustion engine including a plurality of cylinders and an electric motor which are mounted as drive power sources. The control device includes a first control device and a second control device. The first control device is configured to perform a specific cylinder fuel cutoff process of stopping combustion of an air-fuel mixture in some cylinders out of the plurality of cylinders and a transmission process of transmitting engine operation information on execution of the specific cylinder fuel cutoff process to the second control device. The second control device is configured to perform a torque compensation process of controlling the electric motor based on the received engine operation information such that at least a part of a decrease in engine torque due to execution of the specific cylinder fuel cutoff process is compensated for by an output torque of the electric motor. The first control device is configured to perform a process of starting the specific cylinder fuel cutoff process in a combustion cycle when a prescribed waiting time has elapsed after the transmission process has been performed. The waiting time includes a time until the second control device receives the engine operation information after the first control device has transmitted the engine operation information to the second control device.

With this configuration, the waiting time includes the time until the second control device receives the engine operation information after the first control device has transmitted the engine operation information to the second control device. The specific cylinder fuel cutoff process is started in the combustion cycle when the waiting time has elapsed after the transmission process has been performed. Since the specific cylinder fuel cutoff process is started in consideration of a communication delay between the first control device and the second control device in this way, it is possible to prevent the torque compensation using the electric motor from not matching combustion stop of the air-fuel mixture in the specific cylinder fuel cutoff process.

In the control device, the second control device may be configured to perform a calculation process of calculating a compensation torque for compensating for at least a part of the decrease in engine torque as the torque compensation process. The waiting time may include a first time and a second time, where the first time is defined as a time until the second control device receives the engine operation information after the first control device has transmitted the engine operation information to the second control device and the second time is defined as a time required for performing the calculation process.

With this configuration, the waiting time also includes a time required for calculating the compensation torque in the torque compensation process. Accordingly, since the specific cylinder fuel cutoff process is started in consideration of the time required for calculating the compensation torque in addition to the communication delay between the first control device and the second control device, it is possible to further prevent the torque compensation using the electric motor from not matching combustion stop of the air-fuel mixture in the specific cylinder fuel cutoff process.

The control device may further include a third control device configured to receive a control signal from the second control device and to control the electric motor. The second control device may be configured to perform a transmission process of transmitting information on the compensation torque calculated in the calculation process as the control signal to the third control device. The waiting time may include the first time, the second time, and a third time, the third time being defined as a time until the third control device receives the information on the compensation torque after the second control device has transmitted the information on the compensation torque to the third control device.

With this configuration, the waiting time also includes the time until the third control device receives the information on the compensation torque after the second control device has transmitted the information on the compensation torque to the third control device. Accordingly, since the specific cylinder fuel cutoff process is started in consideration of the communication delay between the second control device and the third control device, it is possible to further prevent the torque compensation using the electric motor from not matching combustion stop of the air-fuel mixture in the specific cylinder fuel cutoff process.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a flowchart illustrating a routine which is performed by an ENG-ECU according to the embodiment;

FIG. 3 is a flowchart illustrating a routine which is performed by an HV-ECU according to the embodiment; and FIG. 4 is a timing chart illustrating operations in the embodiment.

DETAILED DESCRIPTION OF EMBODIMENTS

Figure 1:
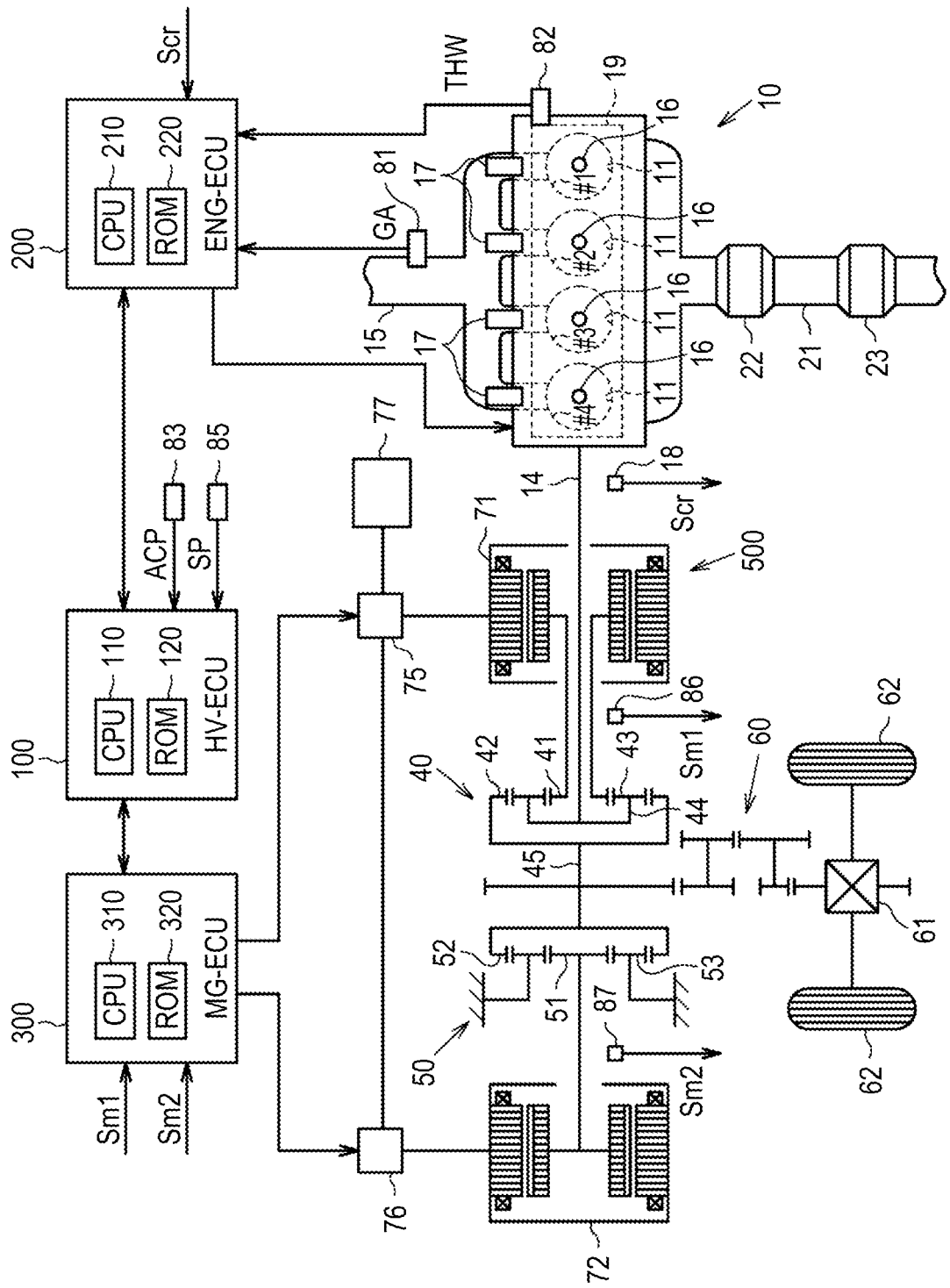
FIG. 1 is a diagram schematically illustrating a configuration of a hybrid vehicle and a control device according to an embodiment.

Hereinafter, a control device for a hybrid vehicle according to an embodiment will be described with reference to the accompanying drawings.

Configuration of Vehicle

As illustrated in FIG. 1, a hybrid vehicle (hereinafter referred to as a vehicle) 500 includes an internal combustion engine 10, a first motor generator (hereinafter referred to as a first MG) 71 which is an electric motor, a second motor generator (hereinafter referred to as a second MG) 72 which is also an electric motor, a first inverter 75, a second inverter 76, and a battery 77.

The internal combustion engine 10, the first MG 71, and the second MG 72 serve as drive power sources of the vehicle 500. Details of the internal combustion engine 10 will be described later. The first MG 71 is a generator motor having functions of both an electric motor and a power generator. The second MG 72 is a generator motor similarly to the first MG 71. The first MG 71 is electrically connected to the battery 77 via the first inverter 75. The second MG 72 is electrically connected to the battery 77 via the second inverter 76. The first inverter 75 and the second inverter 76 perform conversion of electric power between alternating current and direct current. The battery 77 supplies electric power to the first MG 71 and the second MG 72 or stores electric power which is supplied from the first MG 71 and the second MG 72.

The vehicle 500 includes a power split mechanism 40, a reduction gear 50, a reduction gear mechanism 60, a differential 61, and driving wheels 62. A crank shaft 14, which is an output shaft of the internal combustion engine 10, and a rotation shaft of the first MG 71 are connected to the power split mechanism 40. A rotation shaft of the second MG 72 is connected to the power split mechanism 40 via the reduction gear 50. The power split mechanism 40 is connected to the driving wheels 62 via the reduction gear mechanism 60 and the differential 61.

The power split mechanism 40 is a planetary gear mechanism. The power split mechanism 40 includes a sun gear 41, a ring gear 42, a plurality of pinion gears 43, and a carrier 44. The sun gear 41 is an externally toothed gear. The sun gear 41 rotates on its axis. The ring gear 42 is an internally toothed gear. The ring gear 42 rotates axially with the sun gear 41. The plurality of pinion gears 43 is interposed between the sun gear 41 and the ring gear 42. Each pinion gear 43 engages with both the sun gear 41 and the ring gear 42. The pinion gears 43 can revolve around the sun gear 41. Specifically, the pinion gears 43 are supported by the carrier 44 such that they can rotate and revolve around the sun gear 41. The carrier 44 rotates coaxially with the sun gear 41 with revolution of the pinion gears 43. The sun gear 41 is connected to the rotation shaft of the first MG 71. The carrier 44 is connected to the crank shaft 14. A ring gear shaft 45 which is an output shaft of the ring gear 42 is connected to both the reduction gear 50 and the reduction gear mechanism 60.

The reduction gear 50 is a planetary gear mechanism. The reduction gear 50 includes a sun gear 51, a ring gear 52, and a plurality of pinion gears 53. The sun gear 51 is an externally toothed gear. The sun gear 51 rotates on its axis. The ring gear 52 is an internally toothed gear. The ring gear 52 rotates coaxially with the sun gear 51. The plurality of pinion gears 53 is interposed between the sun gear 51 and the ring gear 52. Each pinion gear 53 engages with both the sun gear 51 and the ring gear 52. The pinion gears 53 are supported such that they can rotate and cannot revolve around the sun gear 51. The sun gear 51 is connected to the rotation shaft of the second MG 72. The ring gear 52 is connected to the ring gear shaft 45.

When the crank shaft 14 of the internal combustion engine 10 inputs a torque to the carrier 44 of the power split mechanism 40, the power split mechanism 40 splits the torque to the sun gear 41 side and the ring gear 42 side. The torque split to the sun gear 41 side is input to the rotation shaft of the first MG 71. When the rotation shaft of the first MG 71 rotates with the torque, the first MG 71 can serve as a power generator.

On the other hand, when the first MG 71 serves as an electric motor, the rotation shaft of the first MG 71 inputs a torque to the sun gear 41 of the power split mechanism 40. In this case, the power split mechanism 40 splits the input torque to the carrier 44 side and the ring gear 42 side. The torque input to the carrier 44 is input to the crank shaft 14. The crank shaft 14 rotates with the torque. In this way, the first MG 71 can apply a torque to the crank shaft 14.

The torque of the internal combustion engine 10 split to the ring gear 42 side or the torque of the first MG 71 is input to the driving wheels 62 via the ring gear shaft 45, the reduction gear mechanism 60, and the differential 61. At this time, the reduction gear mechanism 60 amplifies and outputs the input torque. The differential 61 allows a difference in rotation speed to be generated between the right and left driving wheels 62.

By causing the second MG 72 to serve as a power generator when the vehicle 500 decelerates, a regenerative brake force based on an amount of electric power generated by the second MG 72 is generated in the vehicle 500. On the other hand, when the second MG 72 serves as an electric motor, the torque of the second MG 72 is input to the driving wheels 62 via the reduction gear 50, the ring gear shaft 45, the reduction gear mechanism 60, and the differential 61.

The vehicle 500 includes various sensors such as a first rotation angle sensor 86, a second rotation angle sensor 87, an accelerator sensor 83, and a vehicle speed sensor 85. The first rotation angle sensor 86 is located near the rotation shaft of the first MG 71. The first rotation angle sensor 86 detects a rotational position Sm1 of the rotation shaft of the first MG 71. The second rotation angle sensor 87 is located near the rotation shaft of the second MG 72. The second rotation angle sensor 87 detects a rotational position Sm2 of the rotation shaft of the second MG 72. The accelerator sensor 83 detects an accelerator operation amount ACP which is an amount of operation of an accelerator pedal in the vehicle 500. The vehicle speed sensor 85 is located near the driving wheels 62. The vehicle speed sensor 85 detects a vehicle speed SP which is a traveling speed of the vehicle 500.

Configuration of Internal Combustion Engine

As illustrated in FIG. 1, the internal combustion engine 10 includes the crank shaft 14, a crank angle sensor 18, and a coolant temperature sensor 82.

The internal combustion engine 10 is a serial engine of four cylinders. In the following description, the cylinders 11 of the internal combustion engine 10 are denoted by cylinder numbers such as a first cylinder #1, a second cylinder #2, a third cylinder #3, and a fourth cylinder #4 in the arrangement order of the cylinders. Each cylinder 11 accommodates a piston. The piston can reciprocate in each cylinder 11. The piston in each cylinder 11 is connected to the crank shaft 14 via a connecting rod. The crank shaft 14 rotates with reciprocation of the piston in each cylinder 11. The crank angle sensor 18 is located near the crank shaft 14. The crank angle sensor 18 outputs a signal Scr indicating a rotational position of the crank shaft 14.

The internal combustion engine 10 includes a water jacket 19. The water jacket 19 is a passage in which a coolant for cooling the internal combustion engine 10 flows. The coolant temperature sensor 82 detects a coolant temperature THW which is the temperature of the coolant in the water jacket 19.

The internal combustion engine 10 includes four spark plugs 16. Each spark plug 16 is provided in the corresponding cylinder 11. A tip of each spark plug 16 is exposed in the corresponding cylinder 11. Each spark plug 16 ignites an air-fuel mixture of intake air and fuel in the corresponding cylinder 11 by spark discharge. In one combustion cycle of the internal combustion engine 10, ignition of the air-fuel mixture is performed in the order of the first cylinder #1, the third cylinder #3, the fourth cylinder #4, and the second cylinder #2.

The internal combustion engine 10 includes an intake passage 15, an air flowmeter 81, and a fuel injection valve 17. The intake passage 15 is a passage through which intake air is introduced into each cylinder 11. The intake passage 15 is connected to each corresponding cylinder 11. The air flowmeter 81 is provided in the middle of the intake passage 15. The air flowmeter 81 detects an intake air amount GA which is an amount of air flowing in the intake passage 15. The fuel injection valve 17 is provided in each cylinder 11 and supplies fuel to the corresponding cylinder 11.

The internal combustion engine 10 includes an exhaust passage 21, a three-way catalyst 22, and a gasoline particulate filter (hereinafter referred to as a GPF) 23. The exhaust passage 21 is a passage through which exhaust gas discharged from each cylinder 11 flows. The exhaust passage 21 is connected to each corresponding cylinder 11. The three-way catalyst 22 is provided in the middle of the exhaust passage 21. The three-way catalyst 22 has an oxygen storage capacity and cleans exhaust gas. The GPF 23 is provided in a part downstream from the three-way catalyst 22 in the exhaust passage 21. The GPF 23 catches particulate matter (hereinafter referred to as PM) included in exhaust gas.

Configuration of Control Device

The vehicle 500 includes an HV-ECU 100, an ENG-ECU 200, and an MG-ECU 300 as control devices. The HV-ECU 100 corresponds to a second control device. The ENG-ECU 200 corresponds to a first control device. The MG-ECU 300 corresponds to a third control device.

The HV-ECU 100 and the ENG-ECU 200 can bidirectionally communicate with each other via a communication line. The HV-ECU 100 and the MG-ECU 300 can also bidirectionally communicate with each other via a communication line.

The HV-ECU 100 includes a CPU 110 and a ROM 120 and performs various types of control by causing the CPU 110 to execute a program stored in the ROM 120.

HV-ECU

The HV-ECU 100 comprehensively controls the vehicle 500. The HV-ECU 100 acquires an accelerator operation amount ACP or a vehicle speed SP. The HV-ECU 100 calculates a target engine rotation speed NE* which is a target value of an engine rotation speed NE which is a rotation speed of the crank shaft 14 or a target engine torque Te* which is a target value of an output torque of the internal combustion engine 10 based on the accelerator operation amount ACP, the vehicle speed SP, and the like. The HV-ECU 100 calculates a first target torque Tm1* which is a target value of a torque of the first MG 71 or a second target torque Tm2* which is a target value of a torque of the second MG 72 based on the accelerator operation amount ACP, the vehicle speed SP, and the like.

The ENG-ECU 200 includes a CPU 210 and a ROM 220 and performs various types of control by causing the CPU 210 to execute a program stored in the ROM 220.

ENG-ECU

The ENG-ECU 200 acquires the target engine rotation speed NE* and the target engine torque Te* which are calculated by the HV-ECU 100, and controls an output of the internal combustion engine 10 based on the target engine rotation speed NE* and the target engine torque Te*.

The ENG-ECU 200 acquires the signal Scr from the crank angle sensor 18, the coolant temperature THW, the intake air amount GA, and the like in order to ascertain an operation state of the internal combustion engine 10. The ENG-ECU 200 calculates an engine rotation speed Ne based on the signal Scr. The ENG-ECU 200 calculates an engine load factor KL based on the engine rotation speed NE and the intake air amount GA. The engine load factor KL is a parameter for determining an amount of air with which combustion chambers of the cylinders 11 are charged and is a ratio of an intake air amount per combustion cycle of one cylinder to a reference intake air amount. The reference intake air amount is set to be variable depending on the engine rotation speed NE.

The ENG-ECU 200 calculates a PM deposition amount DPM which is caught by the GPF 23 based on the engine rotation speed NE, the engine load factor KL, the coolant temperature THW, and the like. When the PM deposition amount DPM is equal to or greater than a prescribed value, the ENG-ECU 200 performs a specific cylinder fuel cutoff process (hereinafter referred to as a specific cylinder FC process) as a regeneration process of regenerating the GPF 23. The specific cylinder FC process is a process of discharging oxygen and non-used fuel to the exhaust passage 21 and increasing the temperature of the GPF 23 to combust and remove PM caught by the GPF 23. That is, by discharging oxygen and non-used fuel to the exhaust passage 21, the non-used fuel is combusted to increase the temperature of exhaust gas in the three-way catalyst 22 or the like. The temperature of the GPF 23 increases with the increase in temperature of the exhaust gas. By supplying oxygen to the GPF 23 of which the temperature has increased, the PM caught by the GPF 23 is combusted and removed.

The ENG-ECU 200 repeatedly performs a process of stopping combustion of the air-fuel mixture in one of the four cylinders and performing combustion of the air-fuel mixture in the other three cylinders in one combustion cycle at intervals of a plurality of successive combustion cycles as the specific cylinder FC process.

The ENG-ECU 200 performs fuel cutoff of stopping injection of fuel to the cylinder in which combustion of the air-fuel mixture is stopped. In the following description, the cylinder in which combustion is stopped is referred to as an FC cylinder. Oxygen is discharged from the FC cylinder to the exhaust passage 21. The ENG-ECU 200 appropriately changes a cylinder which is set as the FC cylinder such that the cylinder in which combustion of the air-fuel mixture is stopped is not biased to any specific cylinder.

On the other hand, the ENG-ECU 200 performs injection of fuel into a combustion cylinder which is a cylinder in which combustion of the air-fuel mixture is performed such that an air-fuel ratio of the air-fuel mixture in the cylinder is richer than a stoichiometric air-fuel ratio. Non-used fuel is discharged from the combustion cylinder to the exhaust passage 21.

MG-ECU

The MG-ECU 300 acquires the first target torque Tm1* and the second target torque Tm2* which are calculated by the HV-ECU 100 and controls the first MG 71 and the second MG 72 based on the first target torque Tm1* and the second target torque Tm2*.

The MG-ECU 300 controls the first MG 71 by controlling the first inverter 75. The MG-ECU 300 controls the second MG 72 by controlling the second inverter 76.

The MG-ECU 300 controls the first MG 71 and the second MG 72 while ascertaining states thereof. The MG-ECU 300 acquires the rotational position Sm1 of the rotation shaft of the first MG 71 and the rotational position Sm2 of the rotation shaft of the second MG 72 as parameters required for ascertaining the states of the first MG 71 and the second MG 72.

Torque Compensation

While the specific cylinder FC process is being performed, an engine torque generated by combusting the air-fuel mixture is not acquired in the FC cylinder. Therefore, a torque compensation process is performed to compensate for a decrease of the engine torque.

In order to perform the torque compensation process, the HV-ECU 100 adds a compensation torque Th2 which is an engine torque corresponding to one cylinder of the internal combustion engine 10 to the second target torque Tm2* of the second MG 72. The MG-ECU 300 performs torque compensation by controlling the first inverter 75 based on the second target torque Tm2* to which the compensation torque Th2 has been added in an expansion stroke of the FC cylinder.

Routines which are performed by the ECUs to perform a process associated with the torque compensation will be described below. A routine which is performed by the ENG-ECU 200 is illustrated in FIG. 2. A routine which is performed by the HV-ECU 100 is illustrated in FIG. 3. The routines are repeatedly performed at intervals of a predetermined cycle.

Routine of ENG-ECU

As illustrated in FIG. 2, the ENG-ECU 200 first determines whether there is an execution request for the specific cylinder FC process (S100). When there is no execution request (S100: NO), the ENG-ECU 200 temporarily ends this routine.

On the other hand, when there is an execution request for the specific cylinder FC process (S100: YES), the ENG-ECU 200 calculates a torque application ratio TAR (S110). The torque application ratio TAR is a value indicating a ratio of a value of an engine torque while performing the specific cylinder FC process to a value of an engine torque in one combustion cycle when the specific cylinder FC process is not being performed.

For example, the value of the engine torque in one combustion cycle when the specific cylinder FC process is not being performed is defined as "1." When the number of cylinders of the internal combustion engine is defined as k, the number of FC cylinders in one combustion cycle is defined as n, and a rate of increase of the engine torque due to enrichment of an air-fuel ratio in the combustion cylinder is defined as $\alpha$ %, the torque application ratio TAR has a value expressed by the following Expression (1).

$$TAR = (1/k) \times (k - n) \times (1 + \alpha/100) \qquad (1)$$

For example, when n=1 and $\alpha$=5% are satisfied in an engine with four cylinders, TAR=(¼)×(4−1)×(1+5/100) =0.788 is obtained.

Then, the ENG-ECU 200 performs a first transmission process of transmitting engine operation information associated with execution of the specific cylinder FC process to the HV-ECU 100 (S120). The engine operation information associated with execution of the specific cylinder FC process includes the torque application ratio TAR calculated in S100 and a cylinder number of the FC cylinder in this specific cylinder FC process.

Then, the ENG-ECU 200 calculates a combustion cycle in which the specific cylinder FC process is started based on the engine rotation speed NE and a waiting time TW (S130). In the following description, the combustion cycle in which the specific cylinder FC process is started is referred to as an FC start cycle.

The waiting time TW is a sum of a first time Tw1 required until the HV-ECU 100 receives the engine operation information after the engine operation information has been transmitted in S120, a second time Tw2 which will be described later, and a third time Tw3 which will be described later, and corresponds to a time required until the torque compensation can be performed. The waiting time TW is a fixed value which is determined by specifications of communication circuits to which the communication lines between the ECUs are connected or the CPUs that perform various arithmetic operations. The ENG-ECU 200 calculates a first combustion cycle after the waiting time TW has elapsed from the timing at which the engine operation information has been transmitted in S120 as the FC start cycle.

Then, the ENG-ECU 200 determines whether a cycle is the FC start cycle (S140). When the cycle is not the FC start cycle (S140: NO), the ENG-ECU 200 repeats the process of S140.

On the other hand, when it is determined that the cycle is the FC start cycle (S140: YES), the ENG-ECU 200 performs the specific cylinder FC process (S150) and temporarily ends this routine.

Routine of HV-ECU

As illustrated in FIG. 3, first, the HV-ECU 100 receives the engine operation information which has been transmitted in the process of S120 (S200).

Then, the HV-ECU 100 calculates the compensation torque Th2 and resets the second target torque Tm2* (S210). In S210, a cylinder number requiring torque compensation is ascertained based on the cylinder number of the FC cylinder included in the received engine operation information. A value obtained by multiplying a value acquired by dividing the target engine torque Te* by the number of cylinders k by a reduction gear ratio G from the second MG 72 to the driving wheels 62 is calculated as the compensation torque Th2. By adding the compensation torque Th2 to the current second target torque Tm2, the second target torque Tm2 corresponding to the FC cylinder is reset. A sum of the process times required for the calculation process of S210, that is, calculation of the compensation torque Th2, and reset of the second target torque Tm2* is the second time Tw2.

Then, the HV-ECU 100 performs the second transmission process of transmitting the reset second target torque Tm2* to the MG-ECU 300 (S220). The process of S220 is a transmission process of transmitting information on the compensation torque Th2 calculated in the calculation process of S210, more specifically, the second target torque Tm2* reset based on the compensation torque Th2, as a control signal to the MG-ECU 300. The time required until the MG-ECU 300 receives the second target torque Tm2* after the second target torque Tm2* has been transmitted in S220 is the third time Tw3. The MG-ECU 300 having received the second target torque Tm2* transmitted in S220 controls the second inverter 76 such that the output torque of the second MG 72 reaches the received reset second target torque Tm2* in an expansion stroke of the FC cylinder in which combustion is stopped by performing the specific cylinder FC process.

Then, the HV-ECU 100 resets the target engine torque Te* by multiplying the torque application ratio TAR included in the received engine operation information by the current target engine torque Te* (S230). Then, the HV-ECU 100 performs a process of transmitting the reset target engine torque Te* to the ENG-ECU 200 (S240) and temporarily ends this routine.

The ENG-ECU 200 having received the reset target engine torque Te* controls the internal combustion engine 10 such that the reset target engine torque Te* is obtained. By resetting the target engine torque Te* of the internal combustion engine 10 in this way, it is possible to prevent an actual engine torque from becoming different from the target engine torque Te* while the specific cylinder FC process is being performed. Accordingly, for example, it is possible to curb an increase of the engine torque of the internal combustion engine 10 due to a difference between the actual engine torque and the target engine torque Te* even when the torque compensation using the second MG 72 is performed. It is also possible to curb occurrence of erroneous abnormality determination due to the difference in torque.

Operations of Embodiment

An example of an execution mode of torque compensation at the time of performing of the specific cylinder FC process is illustrated in FIG. 4. In the example illustrated in FIG. 4, the third cylinder #3 is the FC cylinder.

As illustrated in FIG. 4, when an execution request for the specific cylinder FC process is issued at time t1, engine operation information is transmitted from the ENG-ECU 200 to the HV-ECU 100 at time t2.

Then, a first combustion cycle after the waiting time TW has elapsed from time t2 is calculated as the FC start cycle. Accordingly, in the combustion cycle immediately after an execution request for the specific cylinder FC process has been issued, fuel cutoff of the third cylinder #3 is not performed and combustion of an air-fuel mixture is performed in the third cylinder #3 at time t3. Accordingly, at time t3, the torque compensation using the second MG 72 is not performed.

On the other hand, in this example, since a combustion cycle subsequent to the combustion cycle immediately after an execution request for the specific cylinder FC process has been issued is the FC start cycle, fuel cutoff of the third cylinder #3 is performed in subsequent combustion cycles including the FC start cycle (at time t4 and time t5). At time t4 or time t5, the torque compensation using the second MG 72 is performed to compensate for a decrease in engine torque due to the fuel cutoff of the third cylinder #3.

Advantages of Embodiment (1) The waiting time TW includes the first time Tw1 which is a time until the HV-ECU 100 receives the engine operation information after the ENG-ECU 200 has transmitted the engine operation information to the HV-ECU 100. The specific cylinder FC process is started in the combustion cycle when the waiting time TW has elapsed after the first transmission process has been performed. Since the specific cylinder FC process is started in consideration of a communication delay between the ENG-ECU 200 and the HV-ECU 100 in this way, it is possible to prevent the torque compensation using the second MG 72 from not matching combustion stop of an air-fuel mixture in the specific cylinder FC process.

(2) The waiting time TW also includes the second time Tw2 which is a time required for calculating the compensation torque Th2 in the torque compensation process or resetting of the second target torque Tm2* based on the compensation torque Th2. Accordingly, the specific cylinder FC process is started in consideration of the time required for calculating the compensation torque Th2 or the like in addition to the communication delay between the ENG-ECU 200 and the HV-ECU 100. Accordingly, it is possible to further prevent the torque compensation using the second MG 72 from not matching combustion stop of an air-fuel mixture in the specific cylinder FC process.

(3) The waiting time TW also includes the third time Tw3 which is a time until the MG-ECU 300 receives the information on the compensation torque after the HV-ECU 100 has transmitted the information on the compensation torque to the MG-ECU 300. Accordingly, the specific cylinder FC process is started in consideration of the communication delay between the HV-ECU 100 and the MG-ECU 300. Accordingly, it is possible to further prevent the torque compensation using the second MG 72 from not matching combustion stop of an air-fuel mixture in the specific cylinder FC process.

Modified Examples

This embodiment may be modified as follows. The embodiment and the following modified examples can be combined unless technical conflictions arise.

For example, when the compensation torque Th2 is a fixed value and the compensation torque Th2 does not need to be calculated in the torque compensation process, the second time Tw2 may be excluded from the waiting time TW. The HV-ECU 100 may have the function of the MG-ECU 300. In this case, since a particular MG-ECU 300 does not need to be provided, the third time Tw3 may be excluded from the waiting time TW.

The process in which the specific cylinder FC process is performed is not limited to the regeneration process. For example, the specific cylinder FC process may be performed for catalyst warm-up or sulfur poisoning recovery. For example, when an oxygen storage capacity of the three-way catalyst 22 is equal to or less than a prescribed value, a process of performing control such that combustion of an air-fuel mixture in only some cylinders is stopped and combustion is performed with the air-fuel ratio in the other cylinders as the stoichiometric air-fuel ratio may be employed.

The number of cylinders in which combustion is stopped at the time of performing of the specific cylinder FC process may be appropriately changed with "number of cylinders−1" as a maximum value. The cylinder in which combustion is stopped may be fixed to a predetermined cylinder.

In the torque compensation process, a part of the decrease of the engine torque due to execution of the specific cylinder FC process may be compensated for by the output torque of the second MG 72. The information on the FC cylinder in the engine operation information is not limited to the cylinder number of the FC cylinder, but may be other information. For example, the information may be a crank angle for identifying the FC cylinder.

The GPF 23 is not limited to the GPF which is provided downstream from the three-way catalyst 22 in the exhaust passage 21. The three-way catalyst 22 may be replaced with an oxidation catalyst that oxidizes components included in exhaust gas.

The control device is not limited to a control device including a CPU and a ROM and performing software processes. For example, a dedicated hardware circuit such as an application-specific integrated circuit (ASIC) that performs at least some of the software processes which have been performed in the aforementioned embodiment by hardware may be provided. That is, the control device may have at least one of the following configurations (a) to (c): (a) A configuration in which a processor that performs all the processes in accordance with a program and a program storage device such as a ROM that stores the program are provided; (b) A configuration in which a processor that performs some of the processes in accordance with a program, a program storage device, and a dedicated hardware circuit that performs the other processes are provided; and (c) A configuration in which a dedicated hardware circuit that performs all the processes is provided. Here, the number of software processors including a processor and a program storage device or the number of dedicated hardware circuits may be two or more.

The configuration of the internal combustion engine 10 is not limited to the example of the aforementioned embodiment. For example, the number of cylinders 11 may be changed. The number of cylinders 11 has only to be two or more. The vehicle is not limited to a series/parallel hybrid vehicle and, for example, a parallel hybrid vehicle or a series hybrid vehicle may be employed.

What is claimed is:

1. A control device for a hybrid vehicle that is applied to a hybrid vehicle in which an internal combustion engine including a plurality of cylinders and an electric motor which are mounted as drive power sources, the control device comprising:
    a first processor or dedicated hardware circuit; and
    a second processor or dedicated hardware circuit,
    wherein the first processor or dedicated hardware circuit is configured to perform a specific cylinder fuel cutoff process of stopping combustion of an air-fuel mixture in some cylinders out of the plurality of cylinders and a transmission process of transmitting engine operation information on execution of the specific cylinder fuel cutoff process to the second processor or dedicated hardware circuit,
    wherein the second processor or dedicated hardware circuit is configured to perform a torque compensation process of controlling the electric motor based on the received engine operation information such that at least a part of a decrease in engine torque due to execution of the specific cylinder fuel cutoff process is compensated for by an output torque of the electric motor,
    wherein the first processor or dedicated hardware circuit is configured to perform a process of starting the specific cylinder fuel cutoff process in a combustion cycle when a prescribed waiting time has elapsed after the transmission process has been performed, and
    wherein the waiting time includes a time until the second processor or dedicated hardware circuit receives the engine operation information after the first processor or dedicated hardware circuit has transmitted the engine operation information to the second processor or dedicated hardware circuit.

2. The control device for a hybrid vehicle according to claim 1, wherein the second processor or dedicated hardware circuit is configured to perform a calculation process of calculating a compensation torque for compensating for at least a part of the decrease in engine torque as the torque compensation process, and
    wherein the waiting time includes a first time and a second time, the first time being defined as a time until the second processor or dedicated hardware circuit receives the engine operation information after the first processor or dedicated hardware circuit has transmitted the engine operation information to the second processor or dedicated hardware circuit and the second time being defined as a time required for performing the calculation process.

3. The control device for a hybrid vehicle according to claim 2, further comprising a third processor or dedicated hardware circuit configured to receive a control signal from the second processor or dedicated hardware circuit and to control the electric motor,
    wherein the second processor or dedicated hardware circuit is configured to perform a transmission process of transmitting information on the compensation torque calculated in the calculation process as the control signal to the third processor or dedicated hardware circuit, and
    wherein the waiting time includes the first time, the second time, and a third time, the third time being defined as a time until the third processor or dedicated hardware circuit receives the information on the compensation torque after the second processor or dedicated hardware circuit has transmitted the information on the compensation torque to the third processor or dedicated hardware circuit.

* * * * *